(No Model.)
T. F. OSBURN.
DRAG SAWING MACHINE.
No. 262,463. Patented Aug. 8, 1882.
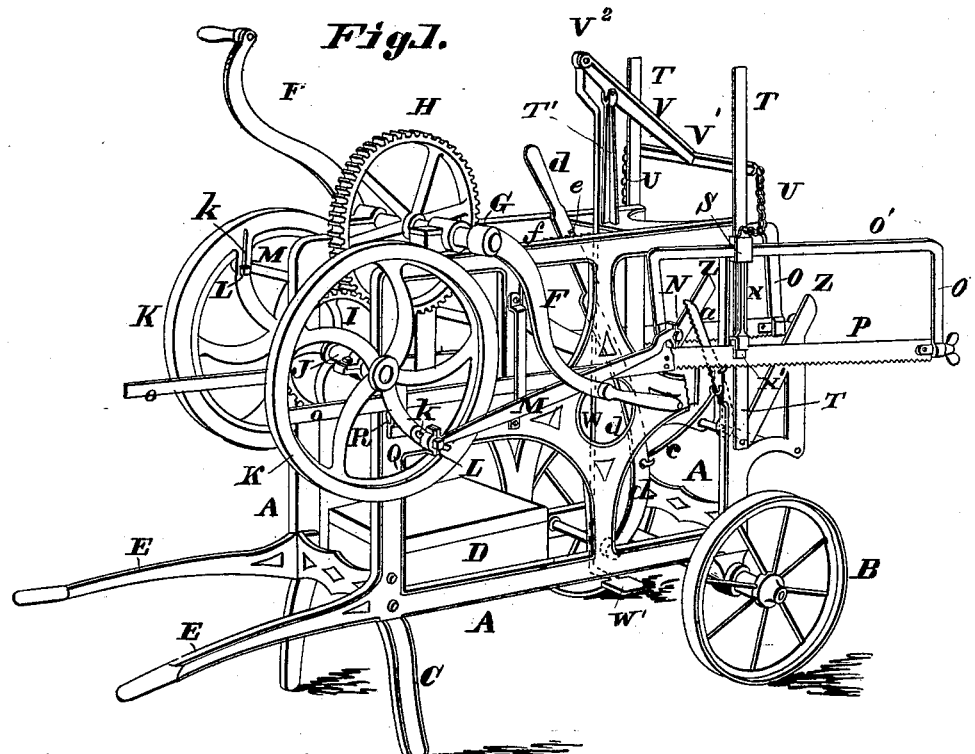
Fig. 1.
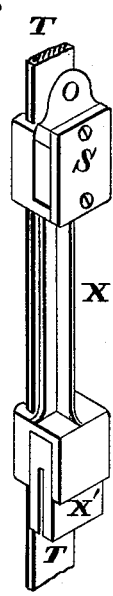
Fig. 2.
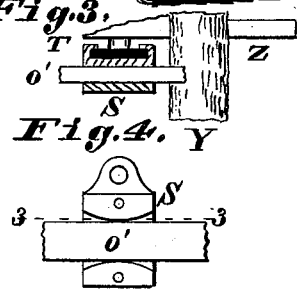
Fig. 3.
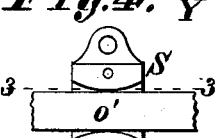
Fig. 4.
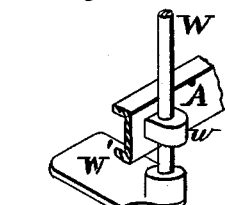
Fig. 7.
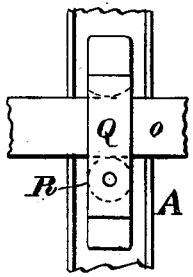
Fig. 5. Fig. 6.
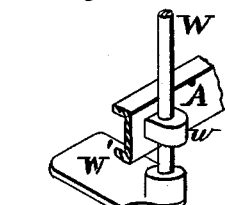
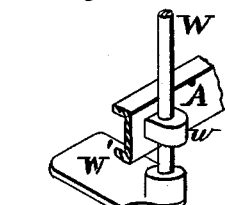
Fig. 8.
Attest:
Charles Pickles
Geo. H. Knight.
Inventor:
Thomas F. Osburn
By Knight Bros
Attys

UNITED STATES PATENT OFFICE.

THOMAS F. OSBURN, OF ST. LOUIS, MISSOURI, ASSIGNOR OF ONE-HALF TO JAMES H. PURDY, OF SAME PLACE.

DRAG-SAWING MACHINE.

SPECIFICATION forming part of Letters Patent No. 262,463, dated August 8, 1882.

Application filed November 28, 1881. (No model.)

*To all whom it may concern:*

Be it known that I, THOMAS F. OSBURN, of St. Louis, in the State of Missouri, have invented a certain new and useful Improvement in Sawing-Machines, of which the following is a specification, reference being had to the accompanying drawings, forming part of the same.

This is an improvement on Letters Patent No. 200,751, granted to me February 26, 1878.

In the drawings, Figure 1 is a perspective view of my improvement. Fig. 2 is an enlarged detail perspective view of the saw-guide. Fig. 3 is a horizontal section of the gravitating saw-frame guide at 3 3, Fig. 4. Fig. 4 is an enlarged detail of the upper saw-frame guide. Fig. 5 is an enlarged view of the saw-arm guide, and Fig. 6 is an edge view of the same. Fig. 7 is an enlarged detail perspective view of the treadle-stirrup. Fig. 8 is an enlarged side view of the wood-clamp.

A is the frame of the machine, supported upon wheels B and legs C.

D is a tool-box.

E are handles.

F are hand-cranks on a shaft, G. A single crank would answer the purpose; or hand lever or levers or treadle power may be used in place of the hand-cranks; or any other available power may be used. The shaft G carries a spur-wheel, H, engaging a pinion, I, the latter being upon a shaft, J. The shaft J carries at its ends fly-wheels K. One of the spokes of each of the wheels K is slotted at $k$ to receive an adjustable wrist or crank pin, L, which is fixed in the slot by a nut screwing upon it, so that it may be adjusted radially to the wheel to change the length of stroke of the saws to enable the machine to be run with more or less power, as may be desired, and increase or diminish the stroke.

M are connecting-rods, of which there is one upon each side of the frame A, connecting the crank-pin L with a similar pin, N, upon the saw-frame O, which is upon that side of the machine.

I will here say that I prefer to arrange the saws P to move in opposite directions to each other, as shown, to equalize the strain upon the machinery, both from the momentum of the saws and the resistance of the wood.

The saw-frame has a guide bar or arm, $o$, extending through a guide-box, Q, within which is a friction-roller, R, upon which the guide-bar bears. The top guide-bar, $o'$, of the saw-frame works in a gravitating box, S, that slides vertically on an upright guide-bar, T, so as to allow the saw-frame to rise and fall, as may be required.

To each box S is attached a chain, U, whose upper end is attached to the cross-bar V' of a lever, V, hinged to a standard, T'. The length of the chain is such that when the cross-bar is elevated the saws are raised sufficiently to allow a piece of wood to be dropped into the forks Z. The other end, V², of the lever V is secured to a treadle-pitman, W, working in ears $w$, and having a stirrup, W', at the lower end. It will be seen that by forcing down the treadle the saws will be lifted up and sustained by the lever V and chains U.

Attached to the box S is a depending arm, X, which is provided with a wooden guide-block, X', embracing the saw-blade. The lower end of the bar X works on the guide T. The saw-guide X' is more especially useful when the saw is first entering the wood.

The wood Y rests upon the forks Z, and is held firmly in the forks by a serrated arm, $a$, hinged to a rod or bar, $b$, and connected by a rod, $c$, to a lever, $d$. The lever $d$ has a lip, $e$, upon the side, engaging a ratchet, $f$, upon the side bar of the frame A to hold the lever in place and the clamping-arm $a$ down upon the wood Y.

Having thus described my invention, the following is what I claim as new therein and desire to secure by Letters Patent:

1. The combination, with saw P and frame O, having sliding bar $o'$, of the vertical guide-bar T, gravitating box S, sliding thereon, cross-bar V', chain U, connecting box with cross-bar, standard T', rod W, having stirrup W', and the lever V, hinged to the standard and connecting the cross-bar with the rod, as set forth.

2. The combination of duplicate saws P O $o'$ P O $o'$, vertical guide-bars T T, boxes S S, sliding on said bars, chains U U, cross-bar V', lever V, standard T', rod W, and stirrup W', pitmen M M, and fly-wheels K K, the said fly-wheels and pitmen adapted to move the saws in opposite directions to equalize strain, as set forth.

THOMAS F. OSBURN.

Witnesses:
SAML. KNIGHT,
GEO. H. KNIGHT.